May 24, 1932.  R. S. RILEY  1,859,573
HEAT EXCHANGE APPARATUS
Filed Aug. 10, 1925  3 Sheets-Sheet 2
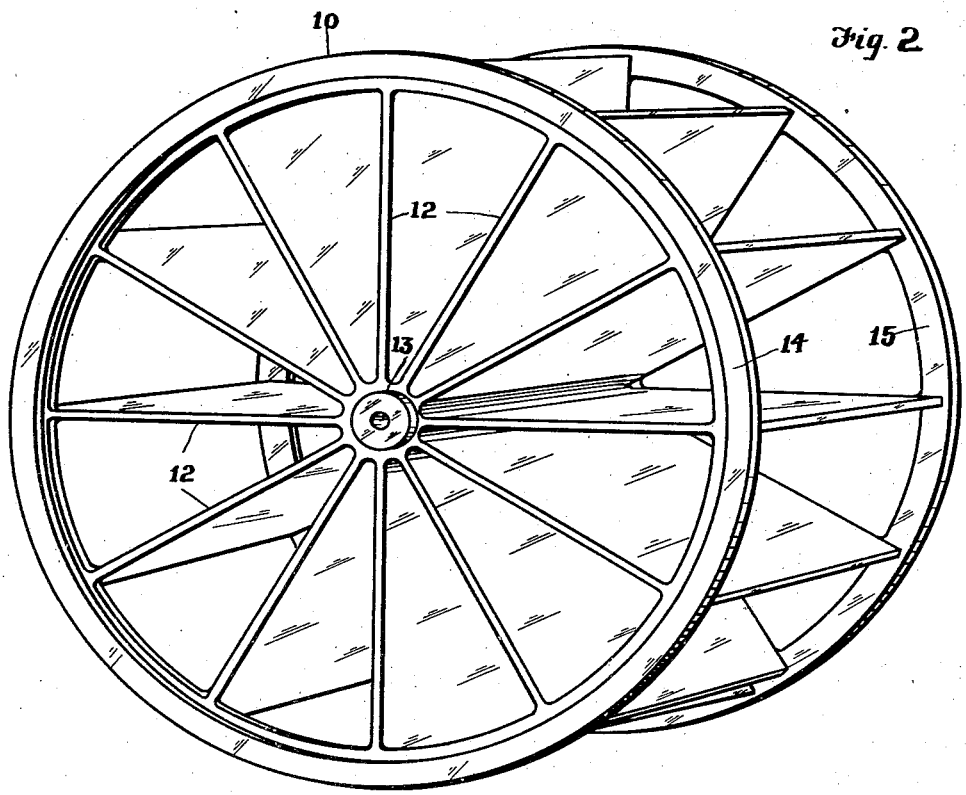
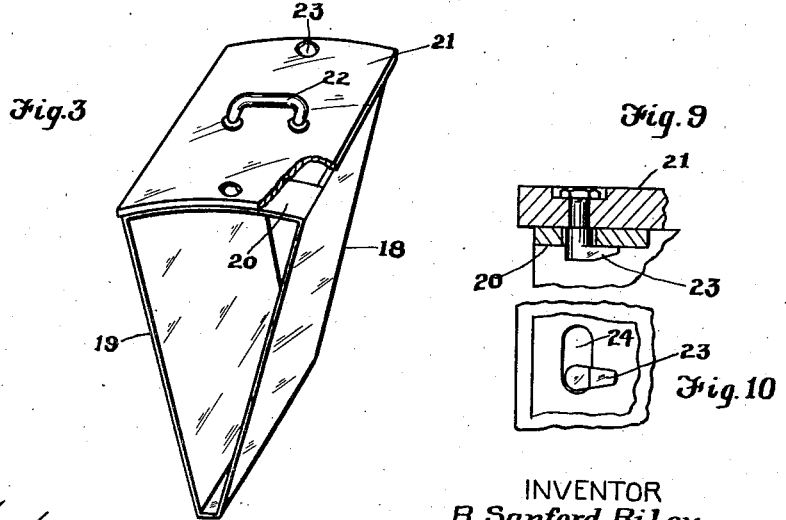
WITNESSES
INVENTOR
R. Sanford Riley
BY
ATTORNEY May 24, 1932.  R. S. RILEY  1,859,573
HEAT EXCHANGE APPARATUS
Filed Aug. 10, 1925   3 Sheets-Sheet 3
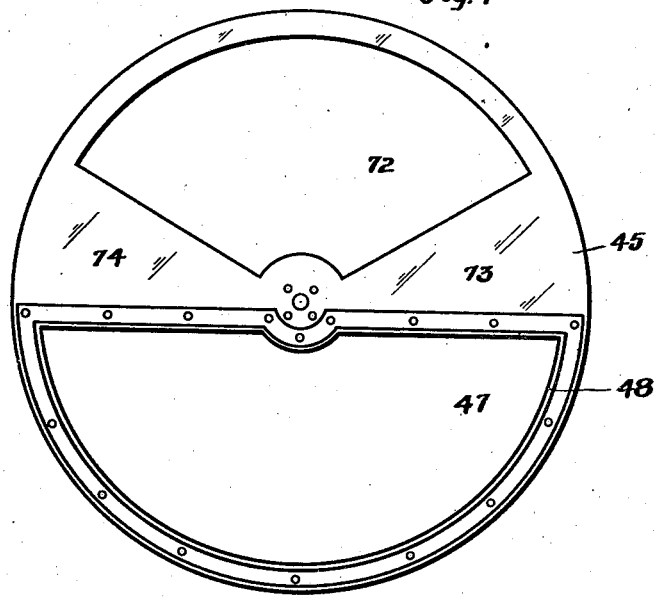
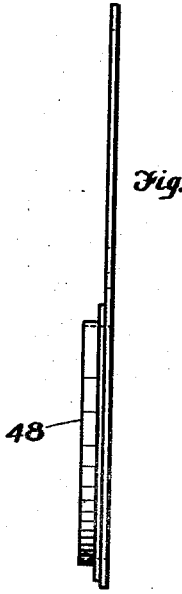
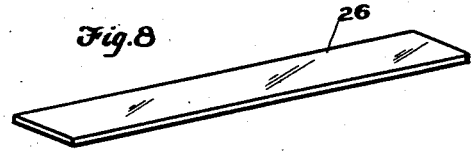
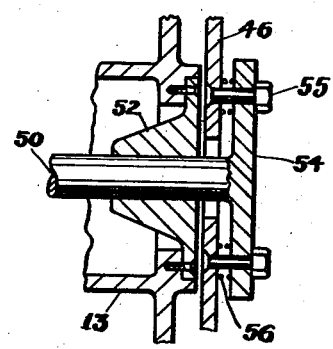
WITNESSES
Chas H. Richards
Irving A. Taylor
INVENTOR
R. Sanford Riley
BY
ATTORNEY Patented May 24, 1932

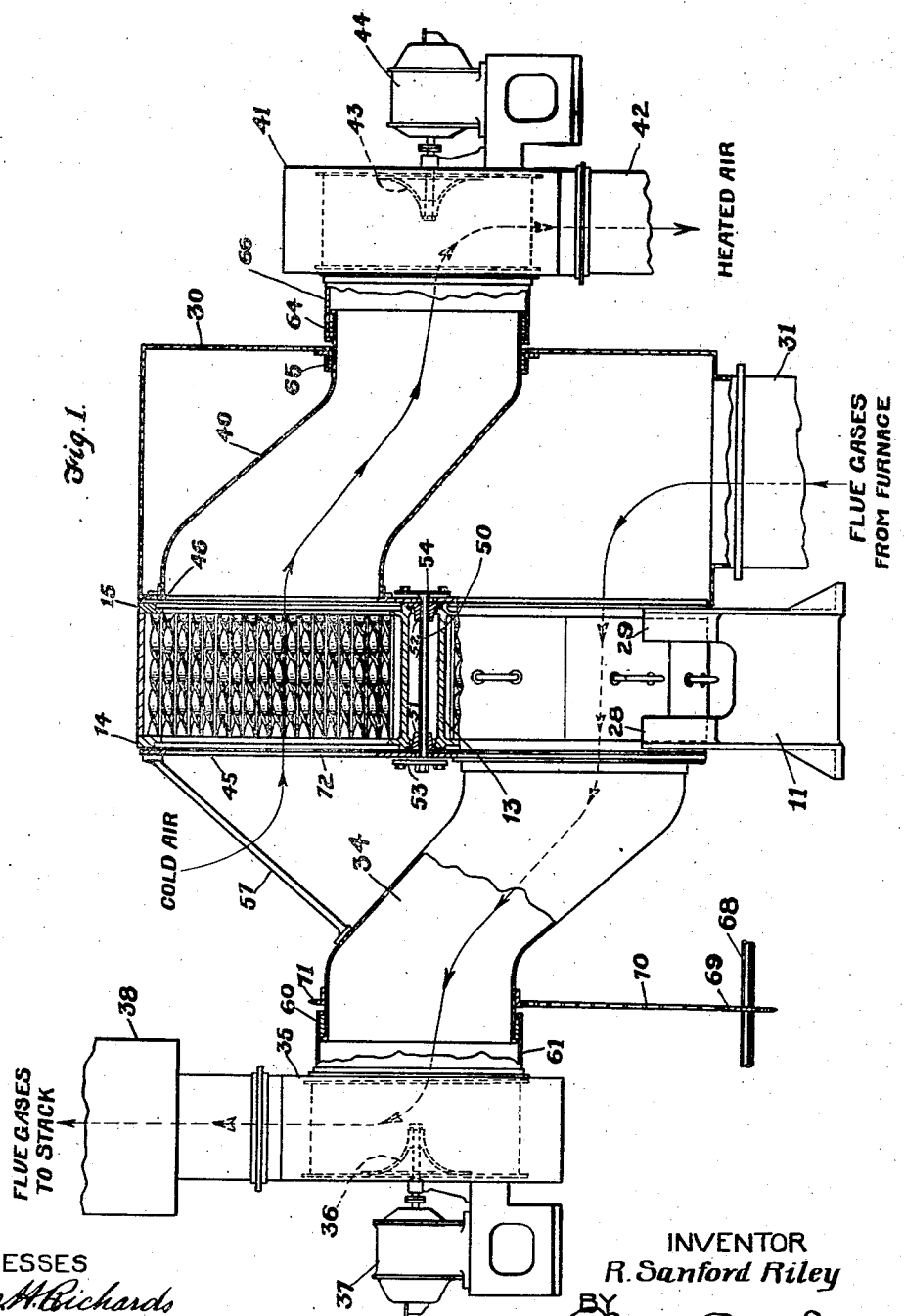

1,859,573

UNITED STATES PATENT OFFICE

ROBERT SANFORD RILEY, OF WORCESTER, MASSACHUSETTS, ASSIGNOR, BY MESNE ASSIGNMENTS, TO THE AIR PREHEATER CORPORATION, OF NEW YORK, N. Y., A CORPORATION OF NEW YORK

HEAT EXCHANGE APPARATUS

Application filed August 10, 1925. Serial No. 49,256.

My invention relates to heat exchange apparatus and more particularly to a furnace preheater which so operates as to transfer heat from the outgoing furnace gases to the air which is to be fed to the furnace.

In accordance with the patent to Ljungstrom et al., No. 1,516,108, of Nov. 18, 1924, the furnace gases are passed on their way to the stack through a heat-exchanging mass of iron mounted in a rotary drum and the cold air is likewise passed through the preheated iron mass on its way to the tuyères. The drum is rotated continuously and the parts are so arranged that the furnace gas and the cold air pass alternately through a given portion of the heat exchange mass. There are various difficulties inherent in this construction and particularly because of the necessity for rotating such a massive and heavy body with a consequently large power consumption. Moreover, a serious problem is involved in stopping the rotation of the drum and by-passing the furnace gases while a man crawls into the apparatus, after it has been cooled, to remove the soot deposited therein and to clean out the passages between the parts of the heat exchange mass.

It is therefore the main purpose of my invention to overcome these difficulties inherent in the preheater as previously constructed by avoiding the use of a massive rotatable body of heat exchange material and thereby to lower the cost of operation of the machine, to simplify and improve its construction, and to minimize the attention required of the furnace attendants to maintain the device in efficient working order.

It is a further object of my invention to provide a heat exchange apparatus which is so arranged and constructed that different portions of the heat exchange material may be easily removed for the purpose of cleaning the same and without seriously interfering with the operation of the apparatus and thereby avoiding loss of efficiency in the power plant.

With these and other objects in view as will be apparent to one skilled in the art, my invention resides in the combination of parts set forth in the specification and covered by the claims appended hereto.

In accordance with my invention, I have discovered that it is feasible to utilize a stationary body of heat exchange material and to provide a rotary valve mechanism which will serve to pass the furnace gas and the air alternately and successively through the separated passages of the apparatus. Also, I have found it feasible to place the heat exchange material in boxes so mounted in the drum that they may be quickly and easily removed and cleaned, without stopping the rotation of the valve mechanism or materially interfering with the operation of the device. This obviates the necessity of shutting down the preheater for any length of time as has heretofore been required, and makes it feasible to operate the preheater continuously and without much attention on the part of an operator.

Referring to the drawings which illustrate one embodiment of my invention, and in which like reference numerals indicate like parts:—

Fig. 1 is a vertical section, partly in elevation, showing somewhat diagrammatically a construction embodying my invention;

Fig. 2 is a perspective detail, somewhat enlarged, of the drum arranged to hold the heat exchange material;

Fig. 3 is a similar view of one of the heat exchange containers removed from the drum;

Fig. 4 is a detail view of one of the discs which is arranged to carry the revolving valve pipe;

Fig. 5 is a side elevation of the part shown in Fig. 4;

Fig. 6 is a sectional detail showing the manner of mounting the disk of Fig. 4 to rotate with the shaft 50;

Figs. 7 and 8 are perspective views of the heat exchange elements; and

Figs. 9 and 10 show details in section and plan respectively of the cover locking device.

In accordance with my invention, I provide a stationary drum supporting the heat exchange material, arranged in combination with a set of rotary valves, one on each side of the drum so arranged as to pass the furnace gases and the cold air alternately through successive portions of the heat exchange material. As illustrated, the drum 10 is mounted on the arcuate cradle 11 which serves as a support for the heat exchange material, the drum being normally stationary in the cradle, but capable of rotation therein about its axis to permit removal of the heat exchange material in the lower portion thereof. For this purpose, the cradle and the drum are provided with cylindrical bearing portions, or other suitable form of bearings, which permits such movement. As shown in Fig. 2, this drum has radial partitions 12 so arranged as to divide the drum into a number of sectors which are adapted to hold the heat exchange material. These radial partitions 12 are connected at their inner ends to a central hub-like portion 13 and at their outer ends to two spaced rings 14 and 15 which slidably fit in the cradle 11. The heat exchange material is mounted between these partitions 12 in such a manner that the furnace gases and air may pass therethrough transversely of the drum.

In order to make the heat exchange material removable, I prefer to employ a container or box-like structure capable of holding the heat exchange material as a unit and of being removed from the drum without disturbing the contents, so that the latter may be removed from the box container only after it has been taken from the drum. For this purpose, I may utilize the structure shown in Fig. 3 comprising an open ended wedge shaped box shaped to fit between the partitions. This box as illustrated has side walls 18 and 19 joined at the wedge end and connected across the open top by spaced strips 20 arranged to permit access to the interior of the box therebetween. A cover 21 having a handle 22 fastened thereon for suitably manipulating the device is suitably fastened by locks to the strips 20 in such a way as to permit removal of the cover. The locking device, as illustrated in Figs. 9 and 10, may comprise a hook bolt 23 passing through an elongated slot 24 in the strip 20 and arranged to turn in such a way that the hook may be withdrawn through the slot or engaged with the underside of the strip 20 to hold the cover in place.

As will be observed, this box has open ends and is so arranged that it may be filled with any suitable heat exchange material which is adapted to permit the passage of gases therebetween. While I may utilize various types of material, such as chain links and the like, I have illustrated in Figs. 1, 7 and 8 strips of twisted metal 25 arranged alternately with plain strips 26 which extend practically the entire transverse distance through the container and form continuous passages therebetween from one side of the drum to the other.

It will be seen that these boxes may be readily withdrawn from the drum as desired, merely by drawing them out from the pockets between the partitions 12. In order to remove the boxes at the lower portion of the drum, it is merely necessary to rotate the drum in its cradle until the boxes at the lower end are within reach. It will also be observed that the side arms 28 and 29 of the cradle extend sufficiently high to prevent the lower boxes falling out of their setting in the drum.

In order to pass the furnace gases and the cold air alternately through each box of heat exchange material, I utilize a rotary valve and pipe structure as illustrated. To this end, I form a casing 30 at one side of the drum 10, and connect the casing at its lower end to the uptake pipe 31 coming from the furnace and which transmits the furnace flue gases thereto. The furnace gases are permitted to pass through a section of the heat exchange element and then escape through the pipe 34 to the fan casing 35 carrying a suction fan 36, which is suitably driven by a motor 37. The furnace gases then pass upwardly from the fan casing through the stack 38.

In order to pass air through the heat exchange material and to the furnace, I provide a further pipe 40 which communicates at one end with the drum and at the other with the fan casing 41. The air passes from the latter through the down draft flue 42 which leads to the space beneath the furnace stoker. Within the fan casing 41 is a suitable suction fan 43 driven by a motor 44.

In accordance with the main features of my invention, I so arrange the pipes 34 and 40 that they remain in communication with different sectors of the drum and simultaneously revolve about the axis of the drum, substantially 180 deg. apart, so that the furnace gas may pass through approximately one half of the total heat exchange material, while at the same time cold air is being drawn through the remainder of the heat exchange material. These pipes are arranged to revolve slowly, so that by the time the cold air has withdrawn the heat from a given box of heat exchange material, the cold air pipe will have gradually moved to another box of heated material, while the furnace pipe simultaneously moves to reheat the already cold material.

The pipes 34 and 40 may be mounted as illustrated at their inner ends on the rotary disks or valve plates 45 and 46, one of which is illustrated in Fig. 4, and the outer ends of the pipes are suitably mounted in bearings in the fan casings. As shown in Fig. 4, the plates 45 and 46 are cut away throughout substantially one-half of their area to form a semi-circular opening 47 which is surrounded by a flange 48 extending across the disk close to a diameter of the same and thence around the circular peripheral portion of the opening 47. The pipe 34 is shaped at its inner end to fit this semi-circular flange 48 and is suitably fastened thereto so as to be rigidly fixed on the rotary disk 45. The pipe 40 is similarly shaped at its inner end and mounted for rotation on the disk 46.

These valve plates are carried on a spindle 50 mounted centrally of the drum 10 in bearings formed in the hubs 51 and 52 which in turn are supported within the hollow hub portion 13 of the casing and fastened thereto, as shown particularly in Fig. 6. Plates 53 and 54 are fastened on opposite ends of the spindle 50 and are bolted to the disks 45 and 46. The bolts 55 connecting these two parts together have coiled springs 56 surrounding them which are adapted to give a slight degree of resiliency to permit of expansion of the drum and associated parts and yet prevent the leakage of any large amount of furnace gas or air. A tie rod 57 may be employed to aid in supporting the pipe 34 on the valve plate 45, and if desired a similarly arranged rod may be employed to support the pipe 40.

The outer end of the pipe 34 is mounted in a bearing 60 formed in the cylindrical pipe portion 61 projecting from the fan housing 35, and suitable means may be employed for mounting the pipe therein and permit rotation without loss of any considerable amount of gas. The pipe 40 is similarly mounted in bearings 64 and 65 in a pipe 66 projecting inwardly from the fan casing 41 and in a central opening formed in the side wall of the casing 30, as illustrated particularly in Fig. 1. These bearings may be suitably constructed, as is well known by anyone skilled in this art.

The valve mechanism, comprising the valve plates, the pipes 34 and 40 and their associated parts, may be suitably rotated by power driving mechanism, and this is illustrated diagrammatically in Fig. 1 as comprising a driven shaft 68 connected by a sprocket 69 and chain 70 with a sprocket 71 on the pipe 34. Since the pipes 34 and 40 are rigidly fixed to the disks 45 and 46 and the latter are connected together through the central supporting shaft 50, it will be seen that the two pipes rotate in unison, always in the relation illustrated in Fig. 1, so that when one pipe is communicating with one half of the heat exchange material, the other pipe communicates with the other half.

Each valve plate 45 and 46 is provided with an opening 72, which permits the introduction of furnace gas to the pipe 34 or heated air to the pipe 40, and which as illustrated in Fig. 4, is made much smaller than the opening 47 in order to provide two closure areas 73 and 74 between the openings. Each area is made substantially as wide as the space between adjacent radial partitions 12, so that as the disks rotate there can be no possibility of any short-circuiting of the gas and air through one of the heat exchange boxes.

It will now be seen that when the fans 36 and 43 are operated, one to draw the gases up through the furnace pipe 31 and the other to draw the cold air through the drum, and as the valve mechanism slowly rotates, the products of combustion from the furnace pass upwardly through the pipe 31 and then through several of the open ended boxes of heat exchange material and outwardly through the pipe 34 to the stack 38. Similarly, cold air will be drawn from the outside through the opening 72 in the disk 45 and through the spaces between the heat exchange material to withdraw the heat which has previously been stored therein. This air then passes through the revolving pipe 40 and downwardly through the flue 42 to the tuyère feeding passages beneath the stoker of the furnace. These two pipes 34 and 40 slowly revolve about the axis 50 and are thus successively brought into register with each box of heat exchange material, the rate of revolution being such that the iron strips 25 and 26 may serve efficiently to absorb heat from the gases and later transfer this heat to the cold air passing through this preheated material.

When it is desired to clean out the heat exchange material, it is merely necessary to withdraw any one of the boxes and take the heat exchange material therefrom and remove the fuel and coal dust from it and then replace the box. This can be done without stopping the rotation of the valve mechanism, since the absence of this particular amount of heat exchange material will not substantially affect the operation of the device. The cover may be removed from the box and temporarily placed over the opening from which the box was withdrawn. This will obviate any short-circuiting of draft and will keep the gases and air passing properly in the right directions. If desired, extra boxes filled with heat exchange material may be kept on hand to replace those which are removed for cleaning. It is also obvious that various other changes may be made in this construction without departing from the spirit of this invention and the scope of the claims appended hereto.

Having thus described my invention, what I claim as new and desire to secure by Letters Patent is:—

1. A furnace air preheater comprising a stationary casing having open sides and radial partitions forming sector shaped passages therethrough, heat exchange material located between said partitions and arranged to permit the passage of gas through said passages, a flue for furnace gases leading from the furnace and to a stack, an air flue connected with the furnace and a rotary conduit mechanism arranged to connect the furnace gas flue through part of the passages in said casing and to connect the air flue with the outside atmosphere through other passages in said casing, said parts being so constructed and arranged that as the conduit mechanism revolves the furnace gases will successively heat said material in said passages and the cold air will successively withdraw said heat from the preheated material.

2. A furnace air preheater comprising a drum having open ends and radial partitions therein forming separated passages through the drum, rotary valve plates on opposite ends of the drum having openings to register successively with the passages through the drum, and pipe connections with said openings in the rotary plates arranged to connect a furnace gas flue through certain passages in the drum and an air flue through other passages in the drum and to make such connections successively with all of said passages.

3. A furnace air preheater comprising an open ended cylindrical drum having partitions therein forming sector shaped passages through the casing, spaced pieces of heat exchange material in said passages, rotary valve plates mounted over the two ends of the drum and having openings therethrough communicating with said sector passages, and pipes associated with said openings and arranged to revolve therewith to transmit furnace gases through one sector while cold air is admitted through another sector.

4. A furnace air preheater comprising a cylindrical drum having open ends and radial partitions forming passages therethrough, removable heat exchange material in said passages arranged to permit the passage of gas, a spindle centrally mounted in the drum, a rotatable valve plate mounted on the spindle adjacent each open end of the drum, each plate having two openings therethrough, two revoluble pipes each connected with one opening in each plate and having its free end concentric with the spindle so that the pipe may revolve with the attached plate, and means to connect furnace gas and air flues through the other openings in the valve plates and the free ends of each revoluble pipe with the stack and the outside atmosphere, whereby the heated gas and cold air may be passed alternately through the heat exchange passages in the drum.

5. A furnace air preheater comprising a casing having partitions therein forming passages through the casing, containers removably mounted between said partitions, heat exchange material in the containers, means permitting movement of the casing to permit ready removal of any container of heat exchange material, and mechanism for alternately and successively connecting a heated gas flue and an air flue with the various containers in the drum.

6. A furnace air preheater comprising a casing adapted for rotation having partitions therein and openings through an outer wall in the casing, said partitions being arranged to form gas passages through the casing, containers arranged within the casing for removal through said openings, heat exchange material removably mounted in said containers, means to permit rotation of said casing and to bring said openings successively to an accessible position whereby said containers may be removed without stopping the operation of the preheater and means for alternately connecting a given passage through a container first with a heated gas flue and then with an air flue to effect an exchange of heat between said gas and air.

7. A furnace air preheater comprising an open ended cylindrical drum mounted for rotation about a horizontal axis and having openings in its circumferential wall, radial partitions forming passages through the drum, containers between the partitions and removable through said openings, heat exchange material in said containers and revoluble valve mechanism arranged to connect a hot gas flue and an air flue alternately and successively with said containers.

8. In a regenerative preheater for air and similar fluids in furnace plants, a regenerative mass for the fluids comprising a framework having a plurality of radial compartments, removable receptacles positioned in said compartments, and regenerative material positioned in said removable receptacles.

9. In a regenerative preheater for air and similar fluids in furnace plants, a regenerative mass for the fluids comprising a framework having a plurality of radial compartments, removable receptacles positioned in said compartments, and metal plates removably positioned in said removable receptacles.

10. A furnace air preheater comprising a stationary casing having open sides, heat exchange material in said casing having passages therethrough, a flue for furnace gases leading from the furnace and to a stack, an air flue leading to the furnace, and rotary conduit mechanism arranged to connect the furnace gas flue through part of the passages in said material and to connect the air flue with the outside atmosphere through other passages in said material, said parts being so constructed and arranged that as the conduit mechanism revolves the furnace gases will successively heat the material in the casing and the air will successively withdraw said heat from the heated material.

11. A furnace air preheater comprising a drum having open ends, heat exchange material in said drum having passages therethrough, rotary valve mechanism on opposite ends of the drum having openings to register successively with the passages through the drum, and conduit means connecting with the openings in the valve mechanism and arranged to connect a furnace gas flue through part of the passages in the material and an air flue through other passages in the material and to make such connections successively with all of said passages.

12. A furnace air preheater comprising an open ended cylindrical drum, heat exchange material therein having passages therethrough, rotary valve mechanism mounted over the two ends of the drum and having openings therethrough communicating with said passages, and conduit means connected with said openings and arranged to revolve therewith to transmit furnace gases through part of the passages in the material while air is transmitted through other passages.

13. A furnace air preheater comprising an open ended cylindrical drum, heat exchange material therein having passages therethrough, rotary valve mechanism mounted over the two ends of the drum and having openings therethrough communicating with said passages, and conduit means associated with said openings and arranged to revolve therewith to transmit furnace gases through part of the passages in the material while air is transmitted through other passages, the flow of the furnace gases and the air being successive through the passages.

Signed at Worcester, Massachusetts, this 24th day of July, 1925.

R. SANFORD RILEY.